Patented Mar. 3, 1953

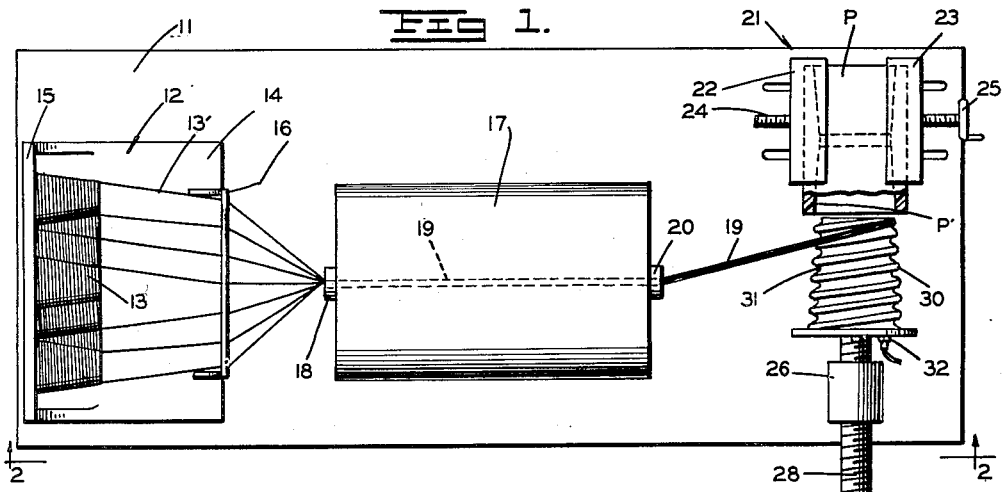
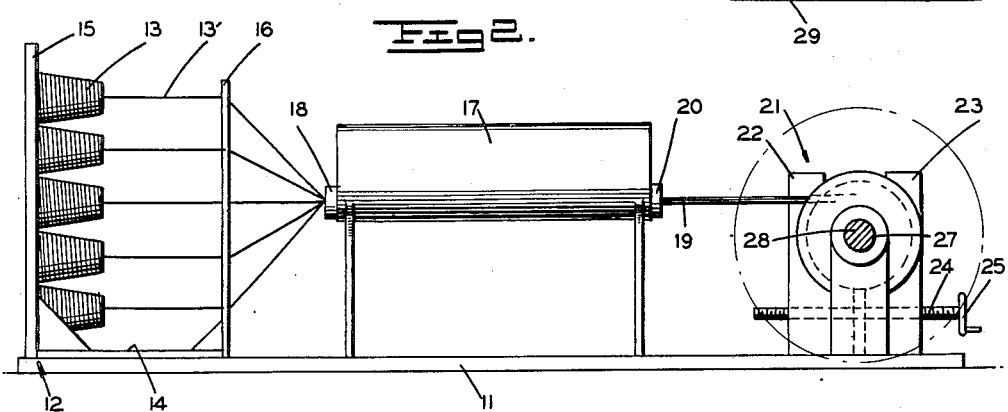
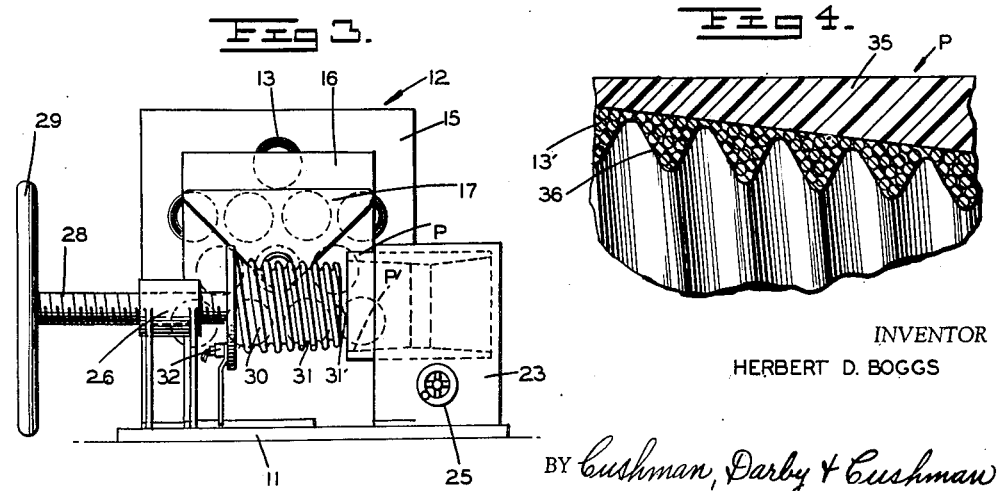
INVENTOR
HERBERT D. BOGGS

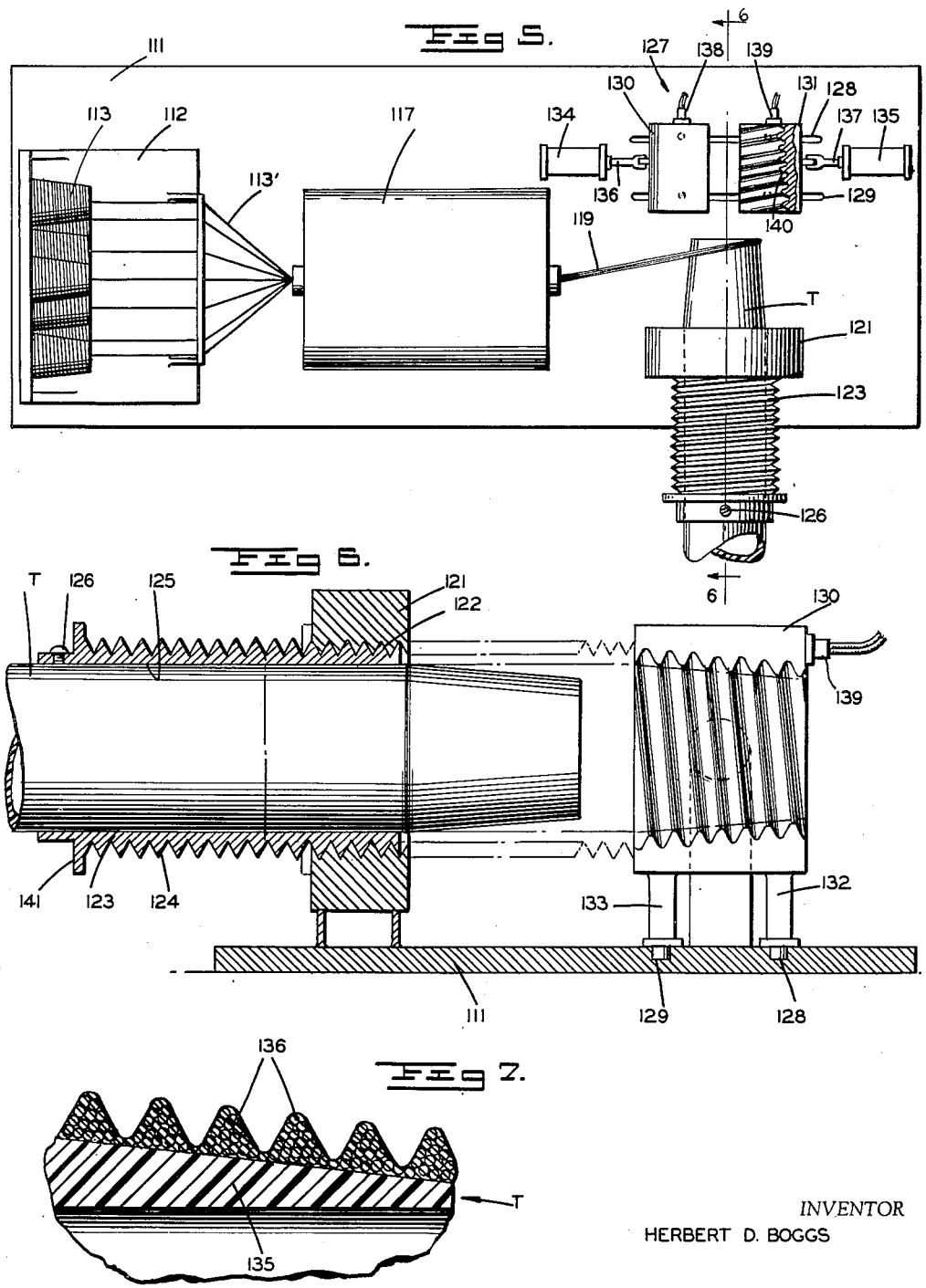

2,629,894

UNITED STATES PATENT OFFICE 2,629,894

APPARATUS AND PROCESS FOR MAKING MOLDED FIBER-FILLED PLASTIC PIPE THREADS

Herbert D. Boggs, Omaha, Nebr., assignor to H. D. Boggs Company, Ltd., Omaha, Nebr., a limited partnership Application September 27, 1949, Serial No. 118,144

15 Claims. (Cl. 18—1)

This invention relates to an apparatus and process for making plastic pipes having molded fiber-filled threads.

Heretofore there were two well-known methods of forming fiber-filled plastic threads on plastic pipes. The first of these consists in machining the threads in a manner similar to that employed in the metal-working art. This threading method involves a distinct disadvantage in that the threading tool severs the fibers or strands in the plastic pipe or tube, resulting in short, severed, individual fibers in each of the machined threads. Since the strength of the threads is thereby made dependent upon the relatively weak plastic rather than the relatively stronger fibers, the threads produced by the machining method are unduly weak. The second of these methods involves pressure molding a fluid mixture of plastic and fibers in the form of a thread by means of a molding die. Since the plastic has a greater tendency to flow than the fibers, the resulting molded thread is composed of an inadequate proportion of fibers to plastic, thereby producing a weak thread whose strength is dependent upon the lesser strength of the plastic rather than the greater strength of the fibers.

It is, therefore, a primary object of the present invention to provide an apparatus and process for making fiber-filled threads on plastic pipes wherein the fibers in the produced threads are continuous, unsevered, and properly distributed throughout the thread cross-section in sufficient density so as to reinforce the plastic and strengthen the thread.

A further object of the invention is to provide an apparatus and process for molding plastic threads with relatively precise dimensions at a relatively low cost of manufacture.

Another object of the invention is to produce a plastic pipe having a plastic thread and a plurality of continuous, longitudinal strands of fiber extending throughout the length of the thread.

Briefly described, the process disclosed in this specification and drawings and illustrative of one possible embodiment of the invention, comprises the steps of grouping a plurality of continuous fiber yarn strands to form an elongated cable-like bundle, saturating said bundle with a fluid plastic resin, winding said bundle in helical form about the external or internal surface of a plastic pipe, and applying heat and pressure to said bundle by means of a die so as to mold the bundle to said pipe surface in the form of a continuous helical thread.

It is to be understood that the scope of the invention is delineated in the appended claims, the particular embodiments shown in the drawings and described in the specification being merely exemplifications.

In the drawings:

Figure 1 is a plan view, somewhat schematic, of one form of apparatus used for molding female threads;

Figure 2 is a vertical sectional view taken substantially on the line 2—2 of Fig. 1;

Figure 3 is a side elevational view of the apparatus as seen from the right-hand side of Fig. 1;

Figure 4 is an enlarged partial sectional view of the completed fiber-filled plastic female thread molded on the interior surface of a plastic pipe;

Figure 5 is a plan view, somewhat schematic, of a second form of apparatus used for molding male threads;

Figure 6 is a vertical sectional view taken substantially on the line 6—6 of Fig. 5; and Figure 7 is an enlarged partial sectional view of the completed male thread molded on the exterior surface of a plastic pipe.

Referring to Figs. 1 to 4 of the drawings, 11 indicates a base member on which the apparatus is mounted. At the left-hand side of the base member 11 there is provided a rack 12 for supporting a plurality of spools 13 formed of yarn fibers or strands 13'. The rack 12 comprises a horizontal portion 14 secured to the base member 11, a vertical spool supporting bracket 15 and a vertical strand guide plate 16. It will be seen in Figs. 1 and 2 that the spools 13 are arranged in vertical and horizontal rows and are mounted for rotation about their respective horizontal axes whereby the fiber strands 13' may be drawn off the spools 13 so as to extend through and be guided by suitable apertures within the strand guide plate 16. The fiber yarn or strands may be composed of fiberglass, cotton, asbestos, linen, or other suitable composition, as will be obvious to those skilled in the art.

After being drawn through the strand guide plate 16, the strands 13' are drawn through a tank 17 filled with a plastic resin of the type compactable with the resin used in the pipe which is to be treated. The plastic resin within the tank 17 is in fluid form and may be of the thermosetting phenolic, melamines, urea, or other suitable types. At the left-hand end of the tank 17 there is provided an annular strand guiding member 18 for grouping the strands 13' to form an elongated cable-like bundle 19 wherein the strands are closely packed in contiguous relationship. As the bundle 19 is drawn through the tank 17 (toward the right, as viewed in Figs. 1 and 2) it is saturated with the plastic resin. At the exit, or right-hand end of the tank 17, there is provided a wiper member 20 which removes the excess resin deposited on the yarn bundle 19.

At the right-hand end of the base member 11 there is provided a supporting means, indicated generally at 21, for fixedly mounting the plastic pipe or tubular member P which is to be threaded. The pipe supporting means 21 comprises two segments 22, 23 slidably mounted on the base member 11 for reciprocating movement toward and away from each other. A threaded rod 24 adapted to be rotated by means of a hand wheel 25 may be provided for adjusting the distance between the segments 22, 23. The opposed faces of segments 22, 23 are provided with concave recesses so as to enable the plastic pipe P to be clamped and securely held therein.

A bracket 26 is secured to the base member 11 and is provided with a threaded opening 27 extending therethrough and having an axis coincident with the axis of the pipe P clamped in the supporting means 21. A threaded shaft 28 is threadably mounted within and extends through the threaded opening 27 of the bracket 26. A hand wheel 39 is fixed to the outer end of the threaded shaft 28 and an externally threaded male die 40 is fixedly secured to the inner end of the threaded shaft 28. As shown in this particular embodiment, the threaded external surface of the male die 30 is of the single thread type and comprises a continuous helical groove 31. It should be noted that the threads of the threaded shaft 28, the fixed bracket 26, and the male die 30 are all of the same pitch, that is, the pitch of the thread which is to be molded to the plastic pipe P.

The internal diameter of the pipe or tubular member P and the external diameter of the male die 30 are substantially equal. The term "substantially equal" as applied to these diameters in the specification and claims is to be understood to include dimensions wherein the external diameter of the male die 30 is somewhat less than the internal diameter of the pipe P so as to provide a clearance between the male die 30 and the interior surface of the pipe P. The die 30 and the interior opening of the pipe P are preferably somewhat tapered. The term "approximately cylindrical" is to be understood, as applied in the specification and claims, to include configurations which are either truly cylindrical or somewhat conical or tapered. The die 30 is provided with an electrical heating element, the outer electrical terminal of which is indicated at 32. It should be understood that any other suitable means for heating the die 30 may be employed.

*Operation for molding female threads*

The spools 13 are first mounted on the upright bracket 15. The strands 13' are drawn through the respective apertures in the strand guide plate 16, and then through the member 18 which serves to group the strands 13' to form the elongated cable-like bundle 19. The bundle 19 is then drawn through the tank 17 where it becomes saturated with the fluid plastic resin. The bundle 19 is then drawn through the wiper member 20 where the excess resin is removed. The end of the bundle 19 is then placed in the beginning or leading portion 31' of the helical groove 31 formed in the male die 30. A plastic pipe P is placed between the segments 22, 23 of the pipe supporting means 21 and the threaded rod 24 is rotated by means of the hand wheel 25 so as to move the segments 22, 23 toward each other and thereby fixedly clamp the pipe P therebetween. The hand wheel 29 is then rotated in a clockwise direction, as viewed in Fig. 2, so as to cause the male die 30 to undergo a spiral-like movement along its axis and toward the plastic pipe P. As the male die 30 is rotated, the bundle 19 will be wound around the die 30 in the form of a helix within the helical groove 31. Simultaneously, the male die 30 will be advanced along its axis and will enter the pipe P so as to cause the die 30 to press the helical bundle 19 against the approximately cylindrical interior surface P'. The pressure applied by the coaction of the pipe surface P' and the groove 31 will shape the bundle 19 into the form of an accurately dimensioned helical screw thread and heat applied to the bundle 19 by means of the heated die 30 will mold the bundle 19 to the interior surface P'.

Referring now to Figs. 5 to 7, there is shown a second form of the apparatus for molding male threads to the exterior surface of a plastic tubular member. The base member 111, the rack 112, the spools 113, and the tank 117 are arranged and cooperate in the same way as above described with respect to their equivalent elements in the modification shown in Figs. 1 to 4 to produce an elongated resin-saturated cable-like bundle 119. At the right-hand end of the base member 111 there is fixedly mounted a bracket 121 provided with a threaded opening 122 extending therethrough. A substantially cylindrical pipe supporting member 123 is externally threaded as at 124 so as to be threadably mounted within the opening 122 of the bracket 121. The pipe supporting member 123 has an opening 125 extending therethrough and is adapted to receive the pipe or tubular member T which is to be externally threaded. A screw detent 126 or other suitable means is employed to clamp the tube T to the pipe supporting member 123.

Axially aligned with respect to the pipe or tube T is a segmented female die indicated generally at 127. A pair of parallel, longitudinally extending slots or grooves 128, 129 are formed in the upper surface of the base member 111. The female die 127 comprises two half segments 130, 131, each of which is provided with a pair of supporting members 132, 133 which are slidably mounted respectively in the grooves 128, 129. It will thus be seen that the die segments 130, 131 are slidably mounted for reciprocating movement toward and away from each other. For moving the die segments 130, 131 there is provided a pair of hydraulic cylinders 134, 135 having therein pistons (not shown) which pistons are connected to the segments 130, 131 by means of piston rods 136, 137. The interior threaded surfaces 140 of the die segments 130, 131 are approximately semi-cylindrical or semi-conical so that when the segments 130, 131 are in closed abutting relation the surfaces 140 combine to form a continuous female threaded die surface having a helical groove. Each of the die segments 130, 131 is provided with an electrical heating element, the outer terminals of which are indicated at 138 and 139, respectively.

*Operation for molding male threads*

The plastic pipe or tube T is placed within the pipe supporting member 123 and secured thereto by means of the screw detent 126. The pipe supporting member 123 is rotated to its initial position (to the left, as viewed in Fig. 6) and the hydraulic cylinders 134, 135 are actuated to move the die segments 130, 131 away from each other to an open position. The elongated cable-like resin-saturated bundle 119 of yarn strands, which is produced in the same manner as above-described with respect to the modification shown in Figs. 1 to 4, is then placed so that its leading end is secured to the edge of the approximately cylindrical exterior surface of the tube T, as shown in Fig. 5. The pipe supporting member 123 is then rotated by any suitable means so as to cause the tube T to move in a spiral-like path along its axis toward the female die 127. It will be obvious as the tube T is simultaneously rotated about its axis and moved longitudinally of its axis, the bundle 119 will be wound on the exterior surface of the tube T in a helical configuration. After the bundle 119 has been wound about the tube T a sufficient number of times, the tube T will have advanced longitudinally of its axis so as to extend between the separated die segments 130, 131. The proper positioning of the tube T with respect to the die segments 130, 131 is obtained when the shoulder 141 abuts against the bracket 121. The hydraulic cylinders 134, 135 are then actuated so as to move the die segments 130, 131 toward each other to closed position. The interior threaded surfaces 140 of the segments 130, 131 will then apply heat and pressure to the helically wound bundle 119 and will shape the bundle 119 so as to mold the latter into the form of an accurately-dimensioned male screw thread bonded to the exterior surface of the tube T.

Referring to Figure 4, there is shown the resultant product produced by the female thread molding apparatus and process disclosed in Figures 1 to 3. The reference numeral 35 indicates the wall of the pipe P. The plastic thread 36 is shown in cross-section as having a dense uniform distribution of fiber strands 13' throughout its cross-sectional area. In Figure 7, the male thread 136 is molded to the exterior surface of the wall 135 of the tubular member T and the strands 113' are densely and uniformly distributed throughout the cross-sectional area of the thread 136.

I claim:

1. An apparatus for making molded threads on plastic tubular bodies comprising means for saturating a continuous length of fiber yarn with a fluid plastic resin, means for mountably supporting a plastic pipe, die means for shaping said saturated yarn into the form of a continuous thread-shaped helix and for molding said helix to an approximately cylindrical surface of the plastic pipe, whereby the molded helix will adhere to said surface so as to form a continuous plastic thread containing a continuous length of fiber yarn.

2. An apparatus for making molded threads on plastic tubular bodies, comprising means for simultaneously dispensing a plurality of continuous fiber yarn strands, means for saturating said strands with a fluid plastic, means for grouping said strands to form an elongated cable-like bundle wherein the strands are closely packed in contiguous relationship, means for mountably supporting a plastic pipe, a die means having a threaded surface including a helical groove, and means for simultaneously winding said elongated bundle in the form of a helix within said helical groove and causing relative movement of said pipe and said die means so as to bring the helical bundle of strands into pressed contact with an approximately cylindrical surface of the plastic pipe.

3. The combination set forth in claim 2 having means to heat said die means.

4. An apparatus for making molded threads on plastic tubular bodies, comprising means for simultaneously dispensing a plurality of continuous fiber yarn strands, means for saturating said strands with a fluid plastic, means for grouping said strands to form an elongated cable-like bundle wherein the strands are closely packed in contiguous relationship, means for mountably supporting a plastic pipe, a substantially cylindrical die having an exterior threaded surface including a helical groove therein, means for rotating said die so as to wind said bundle of strands in the form of a helix within said helical groove, and means for causing relative movement of said pipe and said die so as to place said die within the interior of said pipe whereby the helical bundle of resin-saturated strands will be pressed into contact with and molded to the interior surface of the pipe.

5. The combination set forth in claim 4 having means for heating said die.

6. An apparatus for making molded threads on plastic tubular bodies, comprising means for simultaneously dispensing a plurality of continuous fiber yarn strands, means for saturating said strands with a fluid plastic, means for grouping said strands to form an elongated cable-like bundle wherein the strands are closely packed in contiguous relationship, means for mountably supporting a plastic pipe, a substantially cylindrical die having an exterior threaded surface including a helical groove, a rod fixedly secured to said die and having a threaded portion, a stationary member having a threaded means, said threaded portion engagingly coacting with said threaded means so as to mountably support the die for movement along an axis coincident with the axis of the pipe, and means for rotating said die so as to wind said bundle of strands in the form of a helix within said helical groove and simultaneously to move said die into the interior of said pipe, the internal diameter of the pipe being substantially equal to the external diameter of the die whereby the helical bundle of resin-saturated strands will be pressed into contact with and molded to the interior surface of the pipe.

7. An apparatus for making molded male threads on plastic tubular bodies, comprising means for simultaneously dispensing a plurality of continuous fiber yarn strands, means for saturating said strands with a fluid plastic, means for grouping said strands to form an elongated bundle wherein the strands are closely packed in contiguous relationship, means for supportably mounting a plastic pipe for spiral-like movement along its axis, a female die having a circular interior threaded surface including a helical groove, the axes of said die and said pipe being coincident, said die being fixed against movement in a direction along its axis, and means for simultaneously rotating said pipe and moving said pipe along its axis into said die interior so as to wind the bundle of strands in the form of a helix on the exterior surface of the pipe.

8. The combination set forth in claim 7 wherein said die is formed of a plurality of segments and having means for alternatively moving said segments together in abutting relationship and apart in separated relationship.

9. The combination set forth in claim 8 wherein when said die segments are together in abutting relationship the internal diameter of the die is substantially equal to the external diameter of said pipe.

10. The combination set forth in claim 9 having means for heating said die.

11. A process for making molded threads on plastic tubular bodies comprising the steps of saturating a continuous length of fiber yarn with fluid plastic resin, shaping said saturated yarn into the form of a continuous thread-shaped helix, and molding said helix to an approximately cylindrical surface of a plastic pipe.

12. A process for making molded threads on plastic tubular bodies comprising the steps of grouping a plurality of continuous fiber yarn strands to form an elongated cable-like bundle wherein the strands are closely packed in contiguous relationship, saturating said bundle of strands with a fluid plastic, winding said saturated bundle into a helicoid having an axis coincident with the axis of a plastic pipe and placing the helical bundle of strands in contact with an approximately cylindrical surface of said pipe, and applying heat and pressure to the bundle of strands so as to mold the saturated strands to said pipe surface.

13. A process as set forth in claim 12 including the step of shaping said bundle in the form of a thread during the heat and pressure applying step.

14. A process for making molded threads on plastic tubular bodies comprising the steps of grouping a plurality of continuous fiber yarn strands to form an elongated cable-like bundle wherein the strands are closely packed in contiguous relationship, saturating said bundle of strands with a fluid plastic, winding said saturated bundle in the form of a helix within a helical groove in an approximately cylindrical die, relatively moving said die and a plastic pipe so as to insert said die and bundle within said pipe, and simultaneously pressing said bundle against the interior surface of the pipe and applying heat to said bundle and shaping the bundle in the form of a thread so as to mold said bundle to said interior surface in the form of a female thread.

15. A process for making molded threads on plastic tubular bodies comprising the steps of grouping a plurality of continuous fiber yarn strands to form an elongated cable-like bundle wherein the strands are closely packed in contiguous relationship, saturating said bundle of strands with a fluid plastic, winding said saturated bundle in the form of a helix around an approximately cylindrical exterior surface of a plastic pipe, shaping said helical bundle into the form of a thread, and applying heat and pressure to said thread-shaped bundle so as to mold the latter to said pipe surface.

HERBERT D. BOGGS.

REFERENCES CITED

The following references are of record in the file of this patent:

UNITED STATES PATENTS

| Number | Name | Date |
|---|---|---|
| 684,157 | Williams | Oct. 8, 1901 |
| 1,370,024 | Kempton | Mar. 1, 1921 |
| 2,010,475 | Bowen | Aug. 6, 1935 |
| 2,277,602 | Novak | Mar. 24, 1942 |
| 2,417,510 | McGinnis | Mar. 18, 1947 |